(12) United States Patent
Bhardwaj et al.

(10) Patent No.: US 11,354,711 B2
(45) Date of Patent: *Jun. 7, 2022

(54) SYSTEM AND METHOD FOR ASSESSING VALUATION OF DOCUMENT

(71) Applicant: Innoplexus AG, Eschborn (DE)

(72) Inventors: Gunjan Bhardwaj, Koenigstein (DE); Abhijit Keskar, Pune (IN)

(73) Assignee: Innoplexus AG, Eschborn (DE)

( * ) Notice: Subject to any disclaimer, the term of this patent is extended or adjusted under 35 U.S.C. 154(b) by 276 days.

This patent is subject to a terminal disclaimer.

(21) Appl. No.: 16/367,946

(22) Filed: Mar. 28, 2019

(65) Prior Publication Data
US 2020/0098017 A1    Mar. 26, 2020

Related U.S. Application Data

(60) Provisional application No. 62/664,497, filed on Apr. 30, 2018.

(51) Int. Cl.
| | |
|---|---|
| *G06Q 30/02* | (2012.01) |
| *G06Q 10/00* | (2012.01) |
| *G06Q 30/00* | (2012.01) |
| *G06Q 30/06* | (2012.01) |
| *G06F 16/2455* | (2019.01) |

(52) U.S. Cl.
CPC ... *G06Q 30/0278* (2013.01); *G06F 16/24558* (2019.01)

(58) Field of Classification Search
CPC .................. G06Q 30/0278; G06F 16/24558
USPC .................................. 705/1.1–912, 306, 321
See application file for complete search history.

(56) References Cited

U.S. PATENT DOCUMENTS

| | | | | |
|---|---|---|---|---|
| 8,229,881 | B2 * | 7/2012 | Pedro | G06F 16/367 707/600 |
| 9,111,004 | B2 * | 8/2015 | Carrato | G06F 40/151 |
| 10,509,795 | B2 * | 12/2019 | Farh | G06F 16/24575 |

(Continued)

OTHER PUBLICATIONS

Dempster, A. P., et al. "Maximum Likelihood from Incomplete Data via the EM Algorithm." Journal of the Royal Statistical Society. Series B (Methodological), vol. 39, No. 1, 1977, pp. 1-38. (Year: 1977).*

*Primary Examiner* — Jonathan P Ouellette
(74) *Attorney, Agent, or Firm* — Ziegler IP Law Group, LLC

(57) ABSTRACT

A system and method for assessing valuation of a document. The system includes a server arrangement communicably coupled to a client device. The server arrangement is configured to obtain information pertaining to document and ontologically map to identify relevant entities and semantic inter-relationships between identified entities for the current research work in the document; access information about entities and semantic inter-relationships related to existing research work in technical field from publicly accessible knowledge; compare the entities and the semantic inter-relationships related to the current research work in the document with the entities and the semantic inter-relationships related to existing research work determine a novelty of the document; and determine an assessment value of the document, based on the determined novelty of the document with respect to the publicly accessible knowledge, utilizing an expectation maximization algorithm.

20 Claims, 5 Drawing Sheets

(56) References Cited

U.S. PATENT DOCUMENTS

| | | | |
|---|---|---|---|
| 2004/0093331 A1* | 5/2004 | Garner | A61P 25/06 |
| 2009/0012842 A1* | 1/2009 | Srinivasan | G06F 40/30 |
| | | | 705/12 |
| 2012/0191716 A1* | 7/2012 | Omoigui | H01L 27/14647 |
| | | | 707/740 |
| 2014/0337306 A1* | 11/2014 | Gramatica | G06F 16/2471 |
| | | | 707/706 |
| 2015/0052156 A1* | 2/2015 | Wang | G06F 16/382 |
| | | | 707/751 |
| 2015/0193520 A1* | 7/2015 | Lee | G06Q 10/10 |
| | | | 707/751 |
| 2016/0179945 A1* | 6/2016 | Lastra Diaz | G06F 16/3334 |
| | | | 707/739 |
| 2017/0075877 A1* | 3/2017 | Lepeltier | G06F 40/205 |
| 2017/0235848 A1* | 8/2017 | Van Dusen | G06F 16/904 |
| | | | 705/12 |
| 2018/0165720 A1* | 6/2018 | Barkeloo | G06F 3/0481 |

\* cited by examiner

Information Required

- Researcher(s)
- Research Field
- Department
- Stage Relevance
- Statistical Significance
- Experiment Type
- Protocol Used
- Technique Used
- Materials Used
- Highlights Summary Keywords OK  Cancel

FIG. 2A

Submit New Documents

| Document | Purpose |
|---|---|
| Summary Report.pdf | |
| Graph.xls | |
| Shelx.jpg | |

OK  Cancel

FIG. 2B

SYSTEM AND METHOD FOR ASSESSING VALUATION OF DOCUMENT

CROSS-REFERENCE TO RELATED APPLICATIONS

This is a non-provisional patent application based upon a U.S. provisional patent application No. 62/664,497 as filed on Apr. 30, 2018, and claims priority under 35 U.S.C. 199(e).

TECHNICAL FIELD

The present disclosure relates generally to processing and valuation of documents pertaining to a research field, and more specifically, to a system for assessing valuation of documents, for example, pertaining to drug discovery. Such assessment values may, for example, be determined in terms of a crypto-currency for enabling future transactions using a blockchain. Moreover, the present disclosure relates to a method for assessing valuation of documents. Furthermore, the present disclosure also concerns computer program products for assessing valuation of documents, the computer program products comprising non-transitory machine-readable data storage media having stored thereon program instructions that, when accessed by a processing device cause the processing device to implement the aforementioned method.

BACKGROUND

With the advent of technology and Internet, the sharing of information, especially technical information has increased manifolds. A huge number of research papers or documents (for example, in areas of pharmaceuticals) pertaining to years of research are available all over the internet, accessible to the general masses for knowledge and sharing. However, the research papers available in public domain are only the published ones.

Typically, drug development processes of pharmaceutical companies take over a decade and often costs billions of dollars. A drug development process includes several stages, for example such as, a drug discovery stage, a pre-clinical stage and a clinical stage. At times, the pharmaceutical companies end up doing experiments that have been already done by some other research organizations (or personnel). The pharmaceutical companies are unaware of such experiments, as findings of these experiments are often not published, and therefore, are not available in the public domain.

Currently, even if a research organization is interested in sharing its unpublished experimental findings with others, there is no real-time, secure mechanism for a fair valuation of a document that includes details of the experimental findings. This hampers the research organization's ability to share its experimental findings with other research organizations and pharmaceutical companies. As a result, the whole pharmaceutical community ends up working in silos, at times re-doing the same experiment, which has already been done by other research organizations. This leads to longer drug development cycles, as the pharmaceutical companies may end up re-inventing the wheel each time.

Furthermore, there is no mechanism for fair incentivization of an unpublished research document that the researcher desires to share. Conventionally, online journals (like Elsevier) provide access to published documents on a subscription-basis. The pricing of these subscriptions is independent of the value of individual documents. Moreover, such journals only deal with the published documents, but do not deal with unpublished information. Hence, currently, there is no known online platform, which allows sharing of unpublished documents. Further, no mechanism exists to perform fair valuation of a technical document in real time.

Therefore, in light of the foregoing discussion, there exists a need to overcome the aforementioned drawbacks associated with conventional mechanism for sharing technical information. In particular, there is a need to provide a system for securely sharing unpublished experimental findings in a secure and mutually beneficial way among researchers. Further, there is a need to create synergy among researcher organizations and pharmaceutical companies, and to facilitate the exchange of unpublished documents or information about ongoing experiments while incentivizing the author.

SUMMARY

The present disclosure seeks to provide a system for assessing valuation of a document. The present disclosure also seeks to provide a method for assessing valuation of a document. An aim of the present disclosure is to provide a solution that overcomes at least partially the problems encountered in prior art, and provides a system and a method for assessing valuation of a document in real time so as to enable trading of experiment outcomes among researchers.

In one aspect, an embodiment of the present disclosure provides a system for assessing valuation of a document providing experimental data related to current research work in a technical field, the system comprising a server arrangement comprising a processor communicably coupled via a data communication network with a client device, wherein the processor of the server arrangement is configured to execute machine readable instructions that cause the server arrangement to:

obtain, from the client device, information pertaining to the document, and ontologically map the document to identify relevant entities and semantic inter-relationships between identified entities for the current research work in the document;

access information about entities and semantic inter-relationships related to existing research work in the technical field from publicly accessible knowledge;

compare the entities and the semantic inter-relationships related to the current research work in the document with the entities and the semantic inter-relationships related to existing research work in the technical field to determine a novelty of the document with respect to the publicly accessible knowledge; and determine an assessment value of the document, based on the determined novelty of the document with respect to the publicly accessible knowledge, utilizing an expectation maximization algorithm.

In another aspect, an embodiment of the present disclosure provides a method for valuation of a document providing experimental data related to current research work in a technical field, comprising:

mapping, ontologically, the document to identify relevant entities and semantic inter-relationships between identified entities for the current research work in the document;

accessing information about entities and semantic inter-relationships related to existing research work in the technical field from publicly accessible knowledge;

comparing the entities and the semantic inter-relationships related to the current research work in the document with the entities and the semantic inter-relationships related to existing research work in the technical field to determine a novelty of the document with respect to the publicly accessible knowledge; and determining an assessment value of the document based on the determined novelty of the document with respect to the publicly accessible knowledge, utilizing an expectation maximization algorithm.

In yet another aspect, an embodiment of the present disclosure provides a computer program product for assessing valuation of a document, wherein the document is related to current research work of in a technical field, the computer program product comprising a non-transitory machine-readable data storage medium having stored thereon program instructions that, when accessed by a processing device, cause the processing device to:

ontologically map the document to identify relevant entities and semantic inter-relationships between identified entities for the current research work in the document;

access information about entities and semantic inter-relationships related to existing research work in the technical field from publicly accessible knowledge;

compare the entities and the semantic inter-relationships related to the current research work in the document with the entities and the semantic inter-relationships related to existing research work in the technical field to determine a novelty of the document with respect to the publicly accessible knowledge; and determine an assessment value of the document based on the determined novelty of the document with respect to the publicly accessible knowledge, utilizing an expectation maximization algorithm.

Embodiments of the present disclosure substantially eliminate or at least partially address the aforementioned problems in the prior art, and enables real-time or near real-time valuation of documents.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 2A and 2B are example views of a graphical user interface that are presented to a user, in accordance with an embodiment of the present disclosure;

Figure 1:
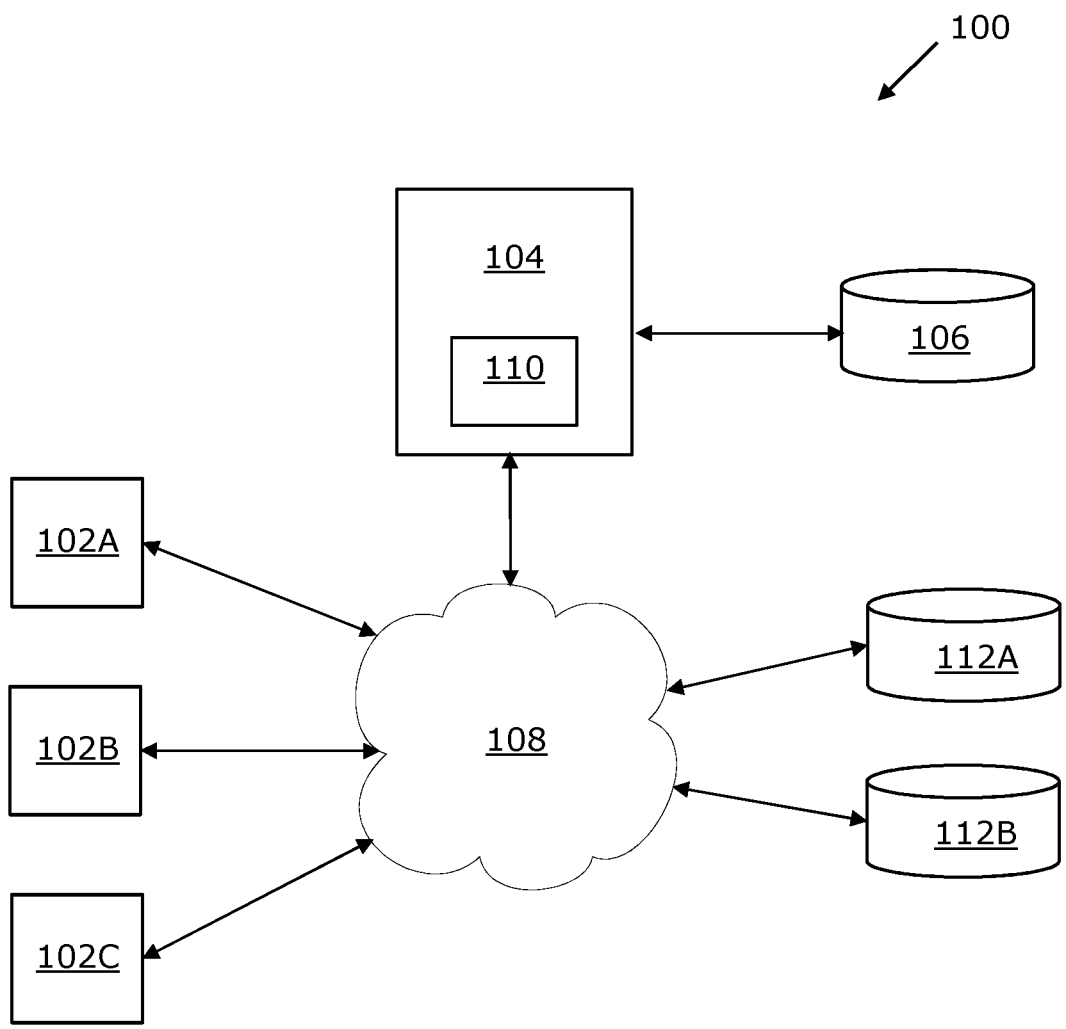
FIG. 1 is a schematic illustration of a network environment in which a system for assessing valuation of a document is implemented, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, an embodiment of the present disclosure provides a system for assessing valuation of a document providing experimental data related to current research work in a technical field, the system comprising a server arrangement comprising a processor communicably coupled via a data communication network with a client device, wherein the processor of the server arrangement is configured to execute machine readable instructions that cause the server arrangement to:

obtain, from the client device, information pertaining to the document, and ontologically map the document to identify relevant entities and semantic inter-relationships between identified entities for the current research work in the document;

access information about entities and semantic inter-relationships related to existing research work in the technical field from publicly accessible knowledge;

compare the entities and the semantic inter-relationships related to the current research work in the document with the entities and the semantic inter-relationships related to existing research work in the technical field to determine a novelty of the document with respect to the publicly accessible knowledge; and determine an assessment value of the document, based on the determined novelty of the document with respect to the publicly accessible knowledge, utilizing an expectation maximization algorithm.

In a second aspect, the embodiments of the present disclosure provide a method for valuation of a document providing experimental data related to current research work in a technical field, comprising:

mapping, ontologically, the document to identify relevant entities and semantic inter-relationships between identified entities for the current research work in the document;

accessing information about entities and semantic inter-relationships related to existing research work in the technical field from publicly accessible knowledge;

comparing the entities and the semantic inter-relationships related to the current research work in the document with the entities and the semantic inter-relationships related to existing research work in the technical field to determine a novelty of the document with respect to the publicly accessible knowledge; and determining an assessment value of the document based on the determined novelty of the document with respect to the publicly accessible knowledge, utilizing an expectation maximization algorithm.

Embodiments of the present disclosure are of advantage in that the system is capable of assessing the valuation of the document in real-time or near real-time. Further, system is capable of determining the assessment value even when incomplete information pertaining to the document is supplied by the user utilizing the expectation maximization algorithm.

Pursuant to embodiments of the present disclosure, the document is an unpublished document, i.e. the document is unavailable in public domain or through any other paid subscription (other than a platform provided by the present system). By determining the assessment value of the document, the system provides a user with a guidance for pricing the document for selling the document to interested parties. Beneficially, the assessment value is indicative of a quantified importance of the current research work from a technical point of view. Thus, the disclosed system provides a potential consumer with an insight into the current research work, and help the consumer in deciding whether or not to purchase the document.

Throughout the present disclosure, the term "document" refers to a set of files in which an observation made in a scientific investigation or experiment is recorded, wherein the observation can be recorded in a form of one or more types of data. Some examples of various types of data are text data, tabular data, image data, video data and audio data. Thus, files can be in any suitable file formats depending upon the type of data that is stored therein. As an example, the set of files could comprise a single file having one or more of: a written text, one or more tables, one or more graphs, or a set of images. As another example, the set of files could comprise a plurality of files having different types of data, for example, such as a written text, one or more tables, one or more graphs, a set of images, one or more videos, or one or more audio clips.

For illustration purposes only, there will now be considered an exemplary network environment, wherein a system for assessing valuation of a document can be implemented pursuant to embodiments of the present disclosure. One such network environment has been illustrated in conjunction with FIG. 1 as explained in more detail below.

The network environment includes a plurality of client devices associated with a plurality of users, a server arrangement of the system, a database arrangement associated with the server arrangement, and a data communication network. The server arrangement comprises a processor communicably coupled via the data communication network with the plurality of client devices. Optionally, the network environment also includes a plurality of database servers communicably coupled via the data communication network with the processor of the server arrangement. It will be appreciated that it is not necessary for the processor of the server arrangement to be coupled in communication with all the client devices simultaneously at all times.

Throughout the present disclosure, the term "server arrangement" relates to an arrangement of at least one server that, when operated, performs real-time valuation of documents using expectation maximization algorithm. The term "server arrangement" generally refers to an application, program, process or device in a client-server relationship that responds to requests for information or services by another application, program, process or device (a client) on a communication network. The term "server" relates to a structure and/or module that include programmable and/or non-programmable components configured to store, process and/or share information. Optionally, the server includes any arrangement of physical or virtual computational entities capable of enhancing information to perform various computational tasks. Furthermore, it should be appreciated that the server may be both single hardware server and/or plurality of hardware servers operating in a parallel or distributed architecture. In an example, the server may include components such as memory, a processor, a network adapter and the like, to store, process and/or share information with other computing components, such as user device/ user equipment. The term "server arrangement" also encompasses software that makes the act of serving information or providing services possible. Optionally, the server is implemented as a computer program that provides various services (such as database service) to other devices, modules or apparatus.

The term "client device" generally refers to a device executing an application, program, or process in a client/ server relationship that requests information or services from another application, program, process or device (namely, a server) on a data communication network. Importantly, the terms "client" and "server" are relative, as an application may be a client to one application but a server to another application. The client device refers to a device associated with a user that acts a client to the server arrangement in a client/server relationship, wherein such a device can be a personal device of the user or a server in a local environment of the user (for example, such as an internal server of a research organization where the current research work has been performed). Examples of such client devices include, but are not limited to, an augmented reality (AR) device, a virtual reality (VR) device, a mixed reality (MR) device, a mobile phone, a smart telephone, a Mobile Internet Device (MID), a tablet computer, an Ultra-Mobile Personal Computer (UMPC), a phablet computer, a Personal Digital Assistant (PDA), a web pad, a Personal Computer (PC), a handheld PC, a laptop computer, a tablet computer, a desktop computer or a combination thereof.

It will be appreciated that a user associated with the client device can be any of the one or more researchers or a representative of the one or more researchers. Beneficially, the user is presented with a graphical user interface, via the client device. Optionally, the graphical user interface is provided in a form of a web form that allows the user to provide the information pertaining to the document. Alternatively, optionally, the graphical user interface is provided by way of a trusted software application that, when executed at the client device, allows the user to select the document and processes the selected document to extract the information pertaining to the document. Optionally, in such a case, the trusted software application is received (for example, downloaded) from the server arrangement or a trusted third party. The trusted third party can be a publicly-accessible digital distribution platform, for example, such as Google Play®, the App Store® (for iOS®) and the like.

As mentioned, the server arrangement is coupled to the client device via the data communication network. It will be appreciated that the data communication network can be an individual network, or a collection of individual networks that are interconnected with each other to function as a single large network. The data communication network may be wired, wireless, or a combination thereof. Examples of the individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, radio networks, telecommunication networks, and Worldwide Interoperability for Microwave Access (WiMAX) networks. Generally, the term "internet" relates to any collection of networks using standard protocols. For example, the term includes a collection of interconnected (public and/or private) networks that are linked together by a set of standard protocols (such as TCP/IP, HTTP, and FTP) to form a global, distributed network. While this term is intended to refer to what is now commonly known as the Internet®, it is also intended to encompass variations that may be made in the future, including changes and additions to existing standard protocols or integration with other media (e.g., television, radio, etc.). The term is also intended to encompass non-public networks such as private (e.g., corporate) Intranets.

According to an embodiment, the information extracted from the document is mapped ontologically to identify relevant entities and semantic inter-relationships between identified entities for the current research work in the document. The information pertaining to the document comprises at least one of: an abstract of the document, a conclusion of the document, a brief note provided as an input by the user, or any set of information, which is indicative of entities and semantic inter-relationships between the entities as mentioned in the document. Alternatively, optionally, the information pertaining to the document comprises the document. It will be appreciated that the system pursuant to embodiments of the present disclosure is capable of determining the assessment value of the document, even when the document is not submitted to the server arrangement. In other words, the aforementioned system is capable of determining the assessment value even when incomplete information pertaining to the document is supplied by the user.

Optionally, the technical field is pharmaceutical drug discovery, and the relevant entities comprise data entries pertaining to one or more of drugs, pathways, proteins and targets. In an example, for a given document related to drug discovery, information pertaining to the given document is indicative of a drug, a pathway, a target and a disease as entities and is also indicative of semantic inter-relationships between the entities. In such a case, the information pertaining to the given document is typically in a form of one or more sentences or phrases in a natural language.

Hereinabove, the term "ontologically mapping" implies that the information extracted from the document, indicative of entities is mapped onto an ontology database to identify relevant entities and semantic inter-relationships between the identified entities. Throughout the present disclosure, the term "ontology database" relates to a data repository that is configured to store information about plurality of entities, wherein said information is indicative of different entities in a technical field, properties of the one or more entities in the technical field, description of the entities and semantic inter-relationships between the one or more entities. The term "semantic inter-relationships" as used throughout the present disclosure, relates to an association between one or more entities, wherein the association can be a technical association, a logical association, a scientific association and so forth. Optionally, the technical field may be pharmaceuticals and the entities may be one or more diseases, drugs, pathways, proteins and targets. In an example, an entity "drug" can be associated with another entity "disease" in several ways. In such an example, the "drug" can be known to be effective in treating the "disease", the "drug" can be known to be ineffective in treating the "disease", the "drug" can aggravate growth of the "disease" and so forth. Consequently, the associations between the "drug" and the "disease" such as "effective in treating", "ineffective in treating" or "aggravate growth" can be the semantic inter-relationships between the two entities. Optionally, parsing techniques can be implemented to identify the semantic inter-relationships between the identified entities. The term "parsing techniques" as used throughout the present disclosure, relates to an analysis performed by the server arrangement, wherein the server arrangement analyses the semantic inter-relationship between the entities and generates a result in a hierarchical structure (such as a hierarchical tree). It will be appreciated that the hierarchical structure determines the publicly-available semantic inter-relationships present between the entities. Optionally, the parsing technique used to identify the semantic inter-relationships between the entities can be a frame semantic parsing technique.

Notably, a semantic inter-relationship between one or more entities in the specific technical field is indicative of a causal relationship between the one or more entities of the technical field that relate two given entities. As an example, in drug discovery, examples of a causal relationship between a drug and a disease could be 'causes', 'inhibits', 'catalyzes' and so on. Herein, the semantic inter-relationships comprise at least one of established relations, derived relations and suggested relations between the one or more of drugs, pathways, proteins and targets. The established relations are the relations between one or more entities such as one or more drugs, pathways, proteins and targets that are present in the ontology database as already established relations from other published and/or unpublished documents in the domain. The derived relations are relations between one or more entities such as one or more drugs, pathways, proteins and targets that may not be established relations but are derived from other published and/or unpublished documents in the domain. The suggested relations between one or more entities such as one or more drugs, pathways, proteins and targets that may not be established or derived relations but may be suggested based on other published and/or unpublished documents in the domain using machine learning algorithms.

Optionally, the relevance of the one or more entities and the semantic inter-relationships between the one or more entities is derived using a ranking mechanism. Notably, the one or more entities and the respective semantic inter-relationships are identified from the document. It will be appreciated that the ranking of entities and the respective semantic inter-relationships are based on the entities and the semantic inter-relationships in the ontology database. Additionally, the ranking mechanism is also based on a location of the one or more entities in the document. Further, the ranking mechanism is also based on the frequency of occurrence of one or more entities in the document.

In an embodiment, the established relations in the ontology that are present in the same sentence in the document towards the top (Abstract) and towards the bottom (Conclusion) in the document are ranked highest. The established relations in the ontology that are present in the same sentence towards the middle of the document are ranked second highest. The derived relations in the ontology that are present in the same sentence in the document towards the top (Abstract) and towards the bottom (Conclusion) in the document are ranked third highest. The derived relations in the ontology that are present in the same sentence towards the middle of the document are ranked fourth highest. The suggested relations in the ontology that are present in the same sentence in the document towards the top (Abstract) and towards the bottom (Conclusion) in the document are ranked fifth highest. The derived relations in the ontology that are present in the same sentence towards the middle of the document are ranked sixth highest. Further, the trending keywords (as discussed later) that are ontology that are present in the same sentence in the document towards the top (Abstract) and towards the bottom (Conclusion) in the document are ranked seventh highest. The trending keywords that are present in the same sentence towards the middle of the document are ranked eighth highest. The trending keywords that are present in the ontology but not present in the document are ranked ninth highest. Further, other words present in the document as per ontology are ranked tenth highest. Furthermore, the synonyms of the words present in the document are ranked eleventh highest.

In the present embodiment, a cumulative rank of the document is calculated based on the individual ranks as discussed above. For example, for each ranking methodology, a score is given to the document based on meeting of parameters of the respective methodology by the document. Further, each ranking methodology is given a predefined weightage and the cumulative rank is thereby calculated based on the score and the weightage for each of the ranking methodology for the document. The cumulative rank, thus obtained is indicative of the 'ontology based value' that further determines the assessment value of the document.

Optionally, the ontology database is configured to store the information about entities in a technical field in a structured manner in a storage unit, such as memory of the ontology database. It will be appreciated that the ontology database may be a lexical ontology that defines knowledge pertaining to the utilization of the one or more entities based on the properties and the semantic inter-relationships, in the given technical field.

Further, the processor of the server arrangement is configured to execute machine readable instructions that cause the server arrangement to access information about entities and semantic inter-relationships related to existing research work in the technical field from publicly accessible knowledge. The publicly accessible knowledge may be related to a plurality of digital libraries that publish technical documents authored by various researchers or research organizations, and other existing research work authored or co-authored previously (namely, prior to the current research work) by the at least one of the one or more researchers that are available in the public domain, and therefore, represent the previous research work of the one or more researchers. Such existing research work may, for example, be pre-clinical reports, clinical reports, scientific articles, theses, granted patents, published patent applications and so on. With respect to drug discovery, some examples of such publicly accessible knowledge are New England Journal of Medicine (NEJM), The Lancet, Journal of the American Medical Association, Annals of Internal Medicine, The British Medical Journal, Elsevier and PubMed.

Optionally, apart from the information pertaining to the document, the processor of the server arrangement is configured to execute machine readable instructions that cause the server arrangement to obtain, from the client device, meta-information pertaining to the document. Optionally, the meta-information comprises information about one or more of: the one or more researchers, a research organization where the current research work has been performed, a statistical significance of the current research work, a set of keywords associated with the current research work, one or more research fields to which the current research work pertains, a hypothesis of the current research work, an experiment performed during the current research work, a stage of drug development to which the current research work is applicable. Additionally, optionally, the meta-information also comprises information pertaining to cost incurred in the current research work of the one or more researchers. As an example, for a given document related to drug discovery, some examples of the one or more research fields may include neurobiology, cardiology, oncology, virology, biophysics, immunology and so forth.

Optionally, the information about the experiment performed during the current research work is indicative of at least one of: a type of experiment performed during the current research work, highlights of the experiment, a protocol used for performing the experiment, key raw materials and/or instruments used for performing the experiment, a technique used for performing the experiment, a sample size of the experiment, a development stage to which the current research work is applicable, a date of completion of the experiment, a duration of the experiment.

In an embodiment, when processing a given document related to existing research work in the technical field, different sections of the given existing document are identified and at least one of the different sections of the given existing document is further processed to identify the entities and the semantic inter-relationships specific to the existing research work. It will be appreciated that technical documents typically have well-defined sections that can be identified from their respective headings, and therefore, it is possible to select at least one of these sections for further processing. As an example, a scientific report related to an experiment may include various sections having suitable headings, for example, such as 'Abstract', 'Introduction', 'Materials and Methods', 'Results', 'Discussion', 'Conclusion' and 'References'. In such a case, the section(s) 'Abstract' and/or 'Conclusion' may be further processed to identify entities and semantic inter-relationships mentioned in the scientific report. As another example, a patent document typically includes sections having headings, for example, such as 'Abstract', 'Background', 'Summary', 'Brief Description of Drawings', 'Detailed Description' and 'Claims'. In such a case, the section(s) 'Abstract' and/or 'Claims' may be further processed to identify entities and semantic inter-relationships mentioned in the patent document.

Optionally, the existing documents are processed by ontologically mapping each of the existing document to identify relevant entities and semantic inter-relationships between identified entities for the existing document. Optionally, in such a case, sentences present in at least one section of each of the existing documents are parsed and then ontologically mapped to the ontology database. Herein, the sematic inter-relationships may be at least one of established relations, derived relations and suggested relations between the one or more entities.

Optionally, the information indicative of the entities and the semantic inter-relationships specific to the existing research work is stored in a data repository of the server arrangement. Optionally, the data repository is implemented by way of data memory associated with the processor of the server arrangement. Alternatively, optionally, the data repository is implemented by way of a database arrangement associated with the server arrangement, wherein the database arrangement comprises one or more databases.

Further, the processor of the server arrangement is configured to execute machine readable instructions that cause the server arrangement to compare the entities and the semantic inter-relationships related to the current research work in the document with the entities and the semantic inter-relationships related to existing research work in the technical field to determine a novelty of the document with respect to the publicly accessible knowledge. Optionally, the comparison is performed by identifying any common entities and semantic inter-relationships between the current research work and the existing research work, and any new entities and/or any new semantic inter-relationships in the current research work with respect to the existing research work. Herein, the comparison is made by comparing each of the existing relations, derived relation and suggested relations pertaining to the current research work with each of the existing relations, derived relations and suggested relations pertaining to the existing research work in the technical field in order to determine novelty of the document related to current research work. It will be appreciated that a document is considered novel only when information pertaining to the current research work is different than the information pertaining to the existing research work in the technical field from publicly accessible knowledge.

Furthermore, optionally, the processor of the server arrangement is configured to execute machine readable instructions that cause the server arrangement to obtain, from a plurality of database servers, a plurality of documents pertaining to the technical field of the current research work. Optionally, in order to obtain the plurality of documents pertaining to the technical field, the plurality of database servers are queried using key words (namely, key strings) that are relevant to the technical field. Hereinabove, the term "database servers" refers to the database servers related to the plurality of digital libraries that publish technical documents authored by various researchers or research organizations, while the term "plurality of documents" refers to all the documents pertaining to the technical field that are available in the public domain, and therefore, represent knowledge available publicly.

Further, the plurality of documents are processed to identify the entities and the semantic inter-relationships related to the technical field Optionally, when processing a given document, different sections of the given document are identified and at least one of the different sections of the given document is further processed to identify the entities and the semantic inter-relationships related to the technical field.

Optionally, the plurality of documents are processed by employing the aforementioned frame semantic parsing technique to generate corresponding semantic frames. Optionally, in such a case, sentences present in at least one section of each of the plurality of documents are parsed and processed to generate the semantic frames. Optionally, these semantic frames form a part of the information indicative of the entities and the semantic inter-relationships related to the technical field. Further, the information indicative of the entities and the semantic inter-relationships related to the technical field is stored at the aforementioned data repository or another data repository of the server arrangement.

Optionally, the processor of the server arrangement is configured to execute machine readable instructions that cause the server arrangement to assign weights to the semantic inter-relationships related to the technical field, based on at least one of: types of causal relationships represented by the semantic inter-relationships between the entities, the number of documents in which the semantic inter-relationships occurred, ranks of digital libraries where the documents were published. It will be appreciated that documents that are available in the public domain would not be of equal importance. Typically, documents related to highly-important research work are more likely to be published in highly ranked digital libraries. As an example, journals of international repute (for example, such as New England Journal of Medicine (NEJM) and Nature) are likely to publish technical documents that are authentic and highly important. Therefore, ranking of the digital libraries is an important factor in the weight assignment.

Moreover, it will be appreciated that a same document may be published in different digital libraries. Optionally, in this regard, all publications of the same document are taken into consideration to calculate a consolidated ranking of the digital libraries in which these publications were made. Optionally, in this regard, the processor of the server arrangement is configured to execute machine readable instructions that cause the server arrangement to obtain, from at least one server, information about individual ranks of the digital libraries, and to normalize the ranks of the digital libraries based upon a suitable normalization scheme.

For illustration purposes only, there will now be considered an example formula for assigning the weights, as follows:

$$W_{a,b,t} = \sum_{j \in J_{a,b,t}} Rj * \frac{1}{|Nd|},$$

wherein:
'$W_{a,b,t}$' represents a weight of a semantic inter-relationship between entities 'a' and 'b', wherein the semantic inter-relationship represents a causal relationship of a type 't',
'$D_{a,b,t}$' represents a set of documents where the semantic inter-relationship occurred,
'$R_j$' represents individual ranks of digital libraries where the documents of said set were published, wherein the ranks lie between 0 and 1, and
'$|N_d|$' represents the number of documents in said set.

Optionally, the processor of the server arrangement is configured to execute machine readable instructions that cause the server arrangement to assign weights to the semantic inter-relationships specific to the current research work, based upon the weights of the semantic inter-relationships related to the technical field.

Continuing from the previous example, the example formula can be modified to calculate the weights for common semantic inter-relationships as follows:

$$W_{a,b,t} = \left( \left( \sum_{j \in J_{a,b,t}} Rj \right) + R \right) * \frac{1}{(|Nd|+1)},$$

wherein the number of documents is increased by one, and a rank of the research organization where the current research work has been performed is added to the sum of the ranks.

Optionally, the weights for new semantic inter-relationships are assigned based upon the rank of the research organization where the current research work has been performed. Alternatively, optionally, the new semantic inter-relationships may be assigned a weight of '1'.

According to an embodiment, the processor of the server arrangement is configured to execute machine readable instructions that cause the server arrangement to determine the assessment value of the document, based on the determined novelty of the document with respect to the publicly accessible knowledge, utilizing an expectation maximization algorithm. The assessment value is indicative of a quantified importance of the current research work from a technical point of view. Thus, the assessment value can be used to provide a potential consumer with an insight into the current research work, and help the consumer in deciding whether or not to purchase the document. Optionally, documents whose assessment values are determined using the aforementioned system are made available for purchase to potential consumers, via an online store or portal. Optionally, such online stores or portals provide a list of documents matching a search criterion of a consumer, and allow the consumer to sort the documents according to corresponding assessment values of the documents, via a graphical user interface.

Further, the assessment value is based on the determined novelty of the document with respect to the publicly accessible knowledge. As mentioned, the novelty of the document is determined by comparing the entities and semantic inter-relationships of the current research work with the entities and sematic relationships of the existing research work. In an example, the assessment value for a document having suggested relations is higher than the document having existing relations. Notably, the expectation maximization algorithm estimates the maximum likelihood of all the individual rankings of the semantic inter-relationships to determine the assessment value. It will be appreciated that other additional factors (as discussed later) are also inputs for the expectation maximization algorithm to determine the assessment value. Beneficially, the expectation maximization algorithm is utilized to determine the assessment value even when some data is missing or latent. Notably, the expectation maximization algorithm is an iterative algorithm and essentially comprises of two steps 'expectation' and 'maximization'. In the expectation, or E-step, the missing inputs are estimated based on the given inputs and current estimate of parameters associated with the document. Optionally, this can be achieved using the conditional expectation. In the maximization or M-step, the likelihood function is maximized under the assumption that the missing inputs are known. The estimate of the missing inputs from the estimation step are used in lieu of the actual missing inputs. Further, the likelihood of the expectation maximization increases with every iteration, thereby generating reliable results for higher number of iterations.

Optionally, the processor of the server arrangement is configured to execute machine readable instructions that cause the server arrangement to obtain, from the client device or from at least one database server, information indicative of valuations of other documents related to previous research work of at least one of one or more contributors of the document. Hereinabove, the term "database server" refers to the database server related to the plurality of digital libraries that publish technical documents authored by various researchers or research organizations, while the term "other documents" refers to all the previous research work authored or co-authored by the at least one of one or more contributors of the document pertaining to the technical field that are available in the public domain. Further, the information indicative of the valuations of other documents is processed to determine a contributor score associated with the at least one of one or more contributors of the document. The contributor score is indicative of the likelihood of the one or more contributors to be able to provide relevant and correct experimental data, considering their previous research work. As an example, a particular contributor, who has been working on drug discovery for lung cancer, may have authored and published his/her previous research work, such that the previous research work includes drugs 'A', 'B' and 'C', their corresponding pathways, a target 'EGFR' and the disease 'lung cancer' as entities. In such a case, if the current research work includes a drug 'D', its corresponding pathway, the target 'EGFR' and the disease 'lung cancer' as entities, then the drug 'D' and its corresponding pathway would be identified as new entities. A potential interpretation of the existence of such new entities is that the particular contributor has been performing experiments to study the effect of various drugs on the disease 'lung cancer', and therefore, his/her research work is likely to be correct. In other words, an existence of new entities in connection with common entities potentially indicate a deeper knowledge and understanding of the particular contributor in the drug discovery for lung cancer, and therefore, the research work of a particular contributor is likely to be a further development and improvement over his/her previous research work. Therefore, the contributor score will be high for such contributor. Further, the assessment value of the document is determined based on the determined contributor score associated with the at least one of one or more contributors of the document. In general, higher the contributor score, higher the assessment value of the document.

Optionally, the processor of the server arrangement is configured to execute machine readable instructions that cause the server arrangement to obtain, from the client device or at least one database server, information indicative of reputation of at least one of one or more contributors of the document in the technical field. The database server is configured to obtain information about contributors, and collate the information about the contributors based upon their field of research from a plurality of database servers. In an example, the at least one database server comprises a third-party database server that provides a professional networking service (namely, a business-oriented social networking service). Some examples of such professional networking services are LinkedIn, Fast Pitch and Konnects (these include registered trademarks).

Notably, the information about the one or more contributors is optionally indicative of at least one of: the one or more contributors, the academic qualifications of the one or more contributors, the academic institutes from where the one or more contributors obtained the academic qualifications, the research organizations and/or departments to which the one or more contributors are currently affiliated, the areas of expertise of the one or more contributors, the areas of interest of the one or more contributors, digital libraries where the one or more contributors have made publications.

Optionally, the information indicative of reputation is processed to determine a reputation score for the at least one of one or more contributors of the document. The reputation score may be determined using a suitable exact inference technique. Optionally, the information about the one or more contributors is processed using conditional probability distribution. As an example, a latent variable 'Education Background' can be determined from random variables such as 'Academic Institute', 'Academic Qualifications', and 'Area of Expertise' using the conditional probability distribution. Likewise, a latent variable 'Current Affiliation' can be determined from random variables such as 'Current Organization', 'Current Department' and 'Current Designation' using the conditional probability distribution. Similarly, a latent variable 'Publication' can be determined from random variables such as 'Congress', 'Patents' and 'Journal' using the conditional probability distribution. In the example, the reputation factor can then be determined from the latent variables 'Education Background', 'Current Affiliation' and 'Publication' using the conditional probability distribution. Additionally, during the aforementioned processing of the information about the one or more researchers, rankings of the academic institutes, the research organizations and the digital libraries are taken into consideration.

Further, the assessment value of the document is determined based on the determined reputation score for the at least one of one or more contributors of the document. In general, higher the contributor score, higher the assessment value of the document.

Optionally, the processor of the server arrangement is configured to execute machine readable instructions that cause the server arrangement to identify trending keywords related to research work in the technical field. Herein, the trending keywords are words that are frequently searched by a plurality of users. The words in a technical field that have a higher frequency of occurrence in the strings searched by the plurality of users are the trending keywords related to research work in the technical field. Notably, the trending keywords related to research work are ranked to determine the highest trend and the lowest trend. In an example, for research work related to 'cancer', the words such as 'carcinoma', 'carcinogen', 'carcinogenic', 'cytology', 'leukemia', 'melanoma', 'metastasis', 'tumor', 'radiation therapy', 'chemotherapy', 'targeted therapy', 'surgery' and so on are the trending keywords. It will be appreciated that the keyword that occur more frequently in the search strings have higher preference as compared to the keywords that occur less frequently in the search strings. In an example, 'cancer' is a well-known term over 'carcinoma', and therefore the keyword 'cancer' will have a higher preference over the keyword 'carcinoma'. Further, the document is analysed to calculate count of presence of the identified and terms similar to the identified trending keywords in the document. Beneficially, the document is not only analysed for trending keywords, but also the terms synonymous to the identified keywords, as it is fairly possible that the document has a frequent occurrence of a synonymous term in comparison to an identified keyword. In an example, the identified trending keyword is 'cancer' (based on search strings), but the document frequently uses the term 'carcinoma' which is synonymous to the trending keyword 'cancer'. In such a case, the count of the term 'carcinoma' will also be calculated.

Further, the calculated count of presence of the identified trending keywords and terms similar to the identified trending keywords in the document are processed to determine a trend score associated with the document. Optionally, the trend score is determined based on the count of the presence of the identified trending keywords and location of the occurrence of the identified keywords and terms similar to the identified keywords within the document. As mentioned earlier, that the document can comprise various sections such as introduction, abstract, detailed explanation and so forth. Furthermore, each section of the electronic document will have a different significance as compared to the other sections of the document. For example, the abstract can have a higher significance as compared to the introduction section. In such an instance, the identified keyword occurring at positions within sections having more significance will have the trend score more than a keyword occurring at positions within sections having less significance. In an example, keywords "leukaemia" and "blood" occur in the abstract section of a research document, whereas a word "infection" occurs within the introduction section of the research document. Furthermore, a relevance of the abstract section of the document is more than the introduction section of the document. Therefore, the keywords "leukaemia" and "blood" are assigned a higher trend score as compared to the keyword "infection". Further, the assessment value of the document is determined based on the determined trend score associated with the document.

Optionally, the processor of the server arrangement is configured to execute machine readable instructions that cause the server arrangement to analyse the document to determine information pertaining to statistical significance of the experimental data in the document. Throughout the present disclosure, the term "statistical significance" as used herein refers to a statistical measure of an extent to which the hypothesis of the current research work has been proven (or has failed) as a result of the current research work. It will be appreciated that experiments that have failed to prove a hypothesis (namely, the experiments in which the hypothesis is proven to be false) can also be considered useful.

Optionally, the determined information pertaining to statistical significance of the experimental data is processed to determine a significance factor associated with the document. Optionally, the significance factor is calculated by employing statistical hypothesis testing, which determines whether or not the result of the current research work is statistically significant. In an example, the significance factor is calculated as a p-value representing a probability that random chance could explain the result. It will be appreciated that in general, a p-value of 5% or lower is considered to be statistically significant. Alternatively, optionally, the significance factor is calculated as a percentage value or a fractional value. Further, the assessment value of the document is determined based on the significance factor associated with the document. In general, higher the significance factor, higher the assessment value of the document.

Optionally, the processor of the server arrangement is configured to execute machine readable instructions that cause the server arrangement to analyse the document to determine information pertaining to completion of the experimental data in the document. It will be appreciated that an experiment for a research work is carried out in several development stages. The experimental data pertaining to the document may be complete, partially complete or incomplete depending on the stage of development of the research work. With respect to drug discovery, the development stage could be a stage of drug development to which the document is related. As an example, with respect to drug discovery, the development stage can be any of: a drug discovery stage, a pre-clinical stage, a clinical stage and a post-approval stage. Further, the information pertaining to completion of the experimental data is processed to determine a completion factor associated with the document. Optionally, the information pertaining to the completion of the experimental data can be processed from the 'Abstract' section or the 'Conclusion' section of the document. Furthermore, optionally, the information pertaining to the completion of the experimental data can be processed using comparison with the experimental data of other documents in the publicly accessible knowledge. Further, the assessment value of the document is determined based on the completion factor associated with the document. In general, higher the completion factor, higher the assessment value of the document.

Optionally, the processor of the server arrangement is configured to execute machine readable instructions that cause the server arrangement to analyse the document to extract information pertaining to sample size taken into consideration for generating the experimental data in the document. The sample size is a number of observations or replicates that are taken into consideration while performing a research such as an experimental study or a statistical study. The sample size is to be chosen critically as the sample size is directly related to the accuracy of results in a research work. Notably, small sample sizes generally lead to erroneous results, often leading to failure of an experiment. Therefore, the sample size is advisable to be kept large.

Further, the extracted information pertaining to the sample size is processed to determine a confidence factor associated with the document. It will be appreciated that a larger sample size will produce a higher value of confidence factor, thereby increasing the reliability of the document. Further, the assessment value of the document is determined based on the confidence factor associated with the document. In general, higher the confidence factor, higher the assessment value of the document.

Optionally, the processor of the server arrangement is configured to execute machine readable instructions that cause the server arrangement to obtain, from the client device, information pertaining to cost incurred in the current research work. The information pertaining to the cost comprises information about at least one of: consumables used in the current research work, instruments used in the current research work, a species on which the experiment has been performed, a type of a drug, a country or place of the current research work, the research organization where the current research work has been performed, the protocols used in the current research work.

Further, the obtained information pertaining to the cost is processed to determine a cost factor associated with the document. Optionally, the information pertaining to the cost is processed using a Bayesian network. As an example, a latent variable 'Infrastructure Cost' can be determined from random variables such as 'Consumables', 'Instruments' and 'Country'; a latent variable 'Manual Labor' can be determined from random variables such as 'Country', 'Organization' and 'Protocol'; a latent variable 'Arrangement Cost' can be determined from a random variable such as 'Species' and 'Drug'. In the example, the cost factor can then be determined from the latent variables 'Infrastructure Cost', 'Manual Labor' and 'Arrangement Cost'. It will be appreciated that the Bayesian network is particularly beneficial in cases where an exact cost of a certain item in a certain country is not known. In such cases, an approximate cost is estimated from other available data using the Bayesian network. As an example, if the current research work were performed in France using an X-ray diffraction device and the exact cost of the X-ray diffraction device in France is not known, the Bayesian network can be used to estimate the cost of the X-ray diffraction device from data available for another country. In such a case, if the cost of a certain experimental device is known in both France and Russia, the Bayesian network can be used to estimate the cost of the X-ray diffraction device in France. Further, the assessment value of the document is determined, based on the cost factor associated with the document. In general, higher the cost factor, higher the assessment value of the document.

Optionally, the processor of the server arrangement is configured to execute machine readable instructions that cause the server arrangement to determine a count of number of past purchases of the document. The count of the number of past purchases of the document, determines the interest of other researchers in the document and the increasing popularity of the document among the research community. Further, the count of number of past purchases is configured to determine an interest factor associated with the document. The interest factor quantifies the increasing popularity of the document. Further, the assessment value of the document is determined based on the interest factor associated with the document. It will be appreciated that a higher interest factor will lead a higher assessment value of the document.

Pursuant to embodiments of the present disclosure, the assessment value is determined based upon the contributor score, the reputation score, the trend score, the significance factor, the completion factor, the confidence factor, the cost factor, and the interest factor. Thus, the system is capable of determining the assessment value even when incomplete information (and meta-information) pertaining to the document is supplied by the user using the expectation maximization algorithm.

Optionally, the processor of the server arrangement is configured to execute machine readable instructions that cause the server arrangement to determine the assessment value of the document in a crypto-currency for enabling transactions of the document using a blockchain. The assessment value is a monetary value. Optionally, the assessment value is in a crypto-currency for enabling future transactions of the document using a blockchain. It will be appreciated that the assessment value can alternatively be in any suitable currency, as required. Optionally, the assessment value provides the user with a guidance for pricing the document for selling the document to research organizations and/or pharmaceutical companies that are interested in buying the document.

The present disclosure also relates to the method as described above. Various embodiments and variants disclosed above, with respect to the aforementioned first aspect, apply mutatis mutandis to the method.

Optionally, the method further comprises:
obtaining a plurality of documents pertaining to the technical field of the current research work;
processing the plurality of documents to identify the entities and the semantic inter-relationships related to the technical field; and
storing the information indicative of the entities and the semantic inter-relationships related to the technical field.

Optionally, the method further comprises assigning weights to the semantic inter-relationships related to the technical field, based on at least one of: types of causal relationships represented by the semantic inter-relationships between the entities, the number of documents in which the semantic inter-relationships occurred, ranks of digital libraries where the documents were published.

Optionally, the method further comprises assigning weights to the semantic inter-relationships related to the current research work based on the weights of the semantic inter-relationships related to the technical field.

In a third aspect, the embodiments of the present disclosure provide a computer program product for assessing valuation of a document, wherein the document is related to current research work of in a technical field, the computer program product comprising a non-transitory machine-readable data storage medium having stored thereon program instructions that, when accessed by a processing device, cause the processing device to:

ontologically map the document to identify relevant entities and semantic inter-relationships between identified entities for the current research work in the document;

access information about entities and semantic inter-relationships related to existing research work in the technical field from publicly accessible knowledge;

compare the entities and the semantic inter-relationships related to the current research work in the document with the entities and the semantic inter-relationships related to existing research work in the technical field to determine a novelty of the document with respect to the publicly accessible knowledge; and determine an assessment value of the document based on the determined novelty of the document with respect to the publicly accessible knowledge, utilizing an expectation maximization algorithm.

DETAILED DESCRIPTION OF THE DRAWINGS

Referring to FIG. 1, illustrated is a schematic illustration of a network environment 100, wherein a system configured to assess valuation of a document is implemented pursuant to embodiments of the present disclosure. The network environment 100 includes a plurality of client devices (depicted as client devices 102A, 102B and 102C) associated with a plurality of users, a server arrangement 104 of the system, an ontology database 106 associated with the server arrangement 104, and a data communication network 108. The server arrangement 104 comprises a processor 110 communicably coupled via the data communication network 108 with the client devices 102A, 102B and 102C. Optionally, the network environment 100 also includes a plurality of database servers (depicted as database servers 112A and 112B) communicably coupled via the data communication network 108 with the processor 110 of the server arrangement 104.

FIG. 1 is merely an example, which should not unduly limit the scope of the claims herein. It is to be understood that the specific designation for the network environment 100 is provided as an example and is not to be construed as limiting the network environment 100 to specific numbers, types, or arrangements of server arrangements, client devices, database arrangements, data communication networks and database servers. A person skilled in the art will recognize many variations, alternatives, and modifications of embodiments of the present disclosure.

Referring to FIGS. 2A and 2B are example views of a graphical user interface that are presented to a user, in accordance with an embodiment of the present disclosure. The graphical user interface allows the user to provide the information pertaining to the document.

With reference to FIG. 2A, a first example view includes text boxes and/or drop-down menus that allow the user to enter details and/or select a suitable option.

With reference to FIG. 2B, a second example view allows the user to select one or more documents for submission.

FIGS. 2A and 2B are merely examples, which should not unduly limit the scope of the claims herein. A person skilled in the art will recognize many variations, alternatives, and modifications of embodiments of the present disclosure. For example, another example view of the graphical user interface can show and allow the user to edit the information provided by the user.

Figure 3:
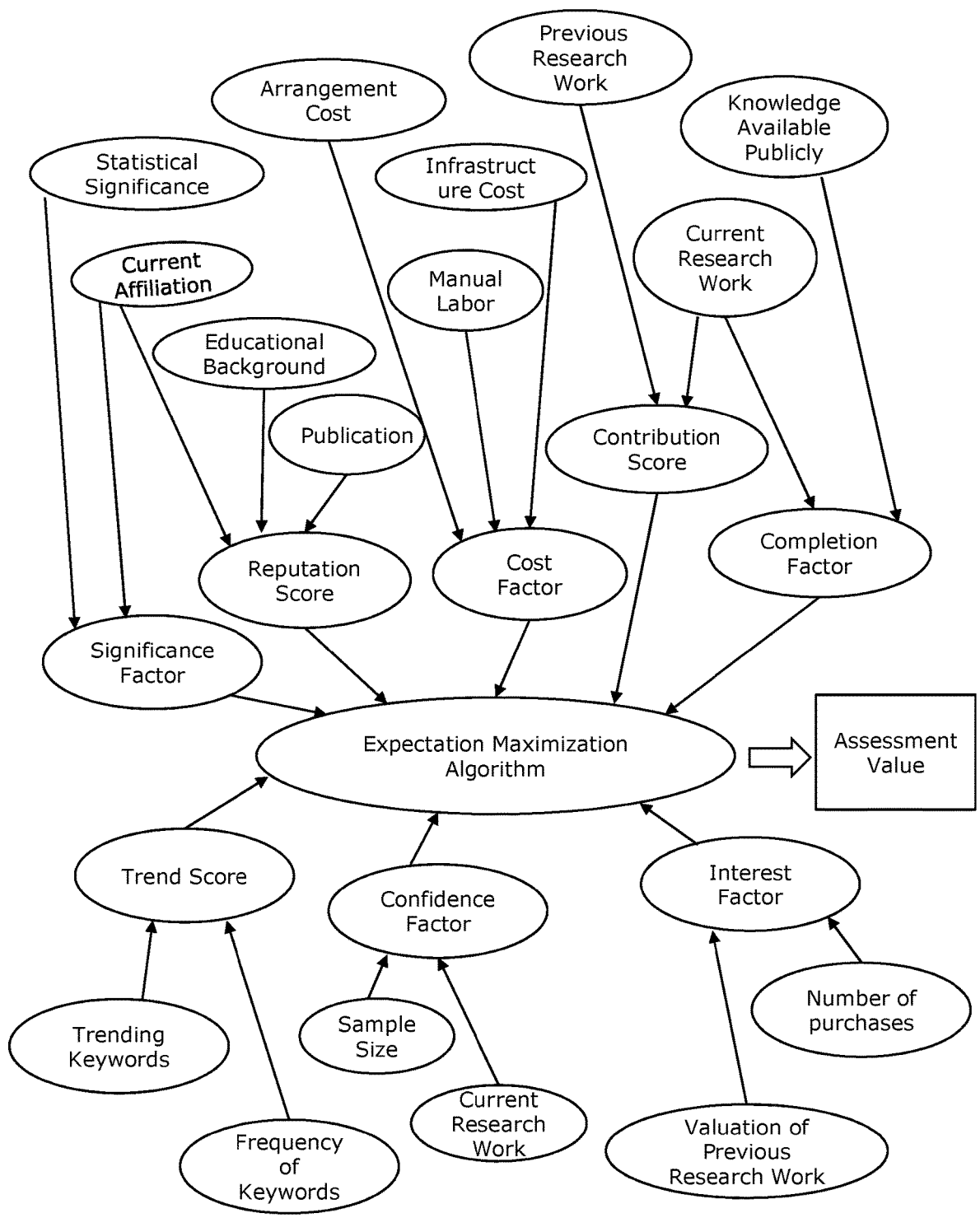
FIG. 3 is a schematic illustration of a data flow diagram representing variables associated with a document that are provided as an input to determine an assessment value of the document, in accordance with a specific embodiment of the present disclosure.

Referring to FIG. 3 is a schematic illustration of a data flow diagram representing variables associated with a document that are provided as an input (for example, to a neural network used by the system) to determine an assessment value of the document, in accordance with a specific embodiment of the present disclosure. The assessment value of the document is determined by utilizing the expectation maximization algorithm. Herein, the assessment value is determined based upon various factors associated with the document, including a contributor score, a reputation score, a trend score, a significance factor, a completion factor, a confidence factor, a cost factor and an interest factor. It will be appreciated that the system pursuant to embodiments of the present disclosure is capable of determining the assessment value even when some information (and metainformation) pertaining to the document is not supplied by the user.

Figure 4:
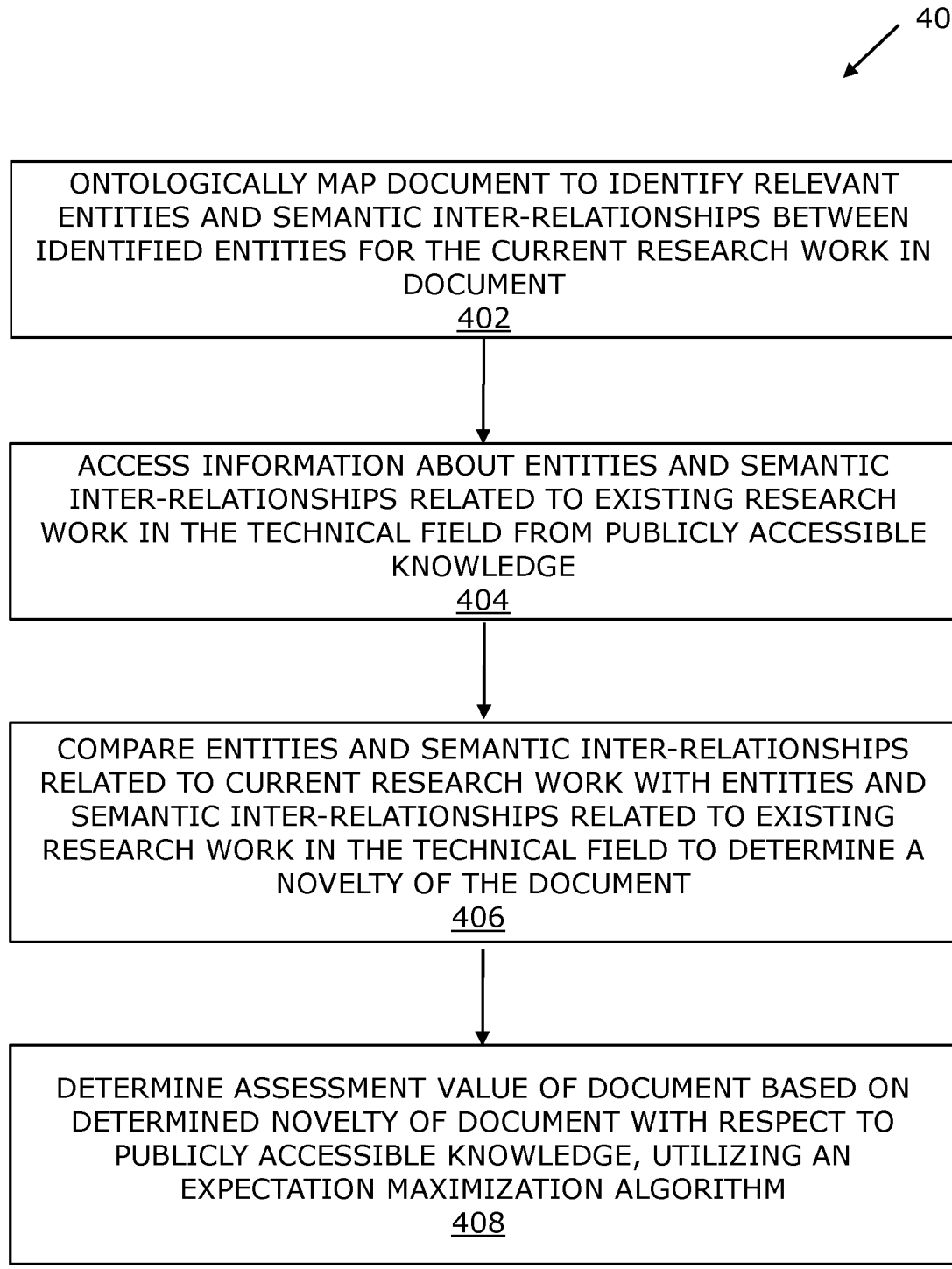
FIG. 4 is an illustration of steps of a method for assessing valuation of a document, in accordance with an embodiment of the present disclosure.

Referring to FIG. 4 is an illustration of steps of a method 400 for assessing valuation of a document, in accordance with an embodiment of the present disclosure. At step 402, the document is ontologically mapped to identify relevant entities and semantic inter-relationships between identified entities for the current research work in the document. At step 404, information about entities and semantic inter-relationships related to existing research work in the technical field is accessed from publicly accessible knowledge. At step 406, the entities and the semantic inter-relationships related to the current research work in the document are compared with the entities and the semantic inter-relationships related to existing research work in the technical field to determine a novelty of the document with respect to the publicly accessible knowledge. At step 408, an assessment value of the document is determined based on the determined novelty of the document with respect to the publicly accessible knowledge, utilizing an expectation maximization algorithm.

The steps 402, 404, 406 and 408 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for assessing valuation of an unpublished document providing experimental data related to current research work in a technical field, the system comprising a server arrangement comprising a processor communicably coupled via a data communication network with a client device, wherein the processor of the server arrangement is configured to execute machine readable instructions that cause the server arrangement to:

obtain, from the client device, information pertaining to the unpublished document by executing a trusted software application that, when executed at the client device, allows a user to select the unpublished document and processes the selected unpublished document to extract the information pertaining to the unpublished document, and ontologically map the information pertaining to the unpublished document to identify relevant entities and semantic interrelationships between identified entities for the current research work in the unpublished document, wherein the information pertaining to the unpublished document comprises at least one of: an abstract of the unpublished document, a conclusion of the unpublished document, a brief note provided as an input by the user, and any set of information indicative of the entities and the semantic interrelationships between the entities as mentioned in the unpublished document, wherein the semantic inter-relationships comprise: established relations, derived relations, and suggested relations between the relevant entities, and wherein the established relations are relations between the relevant entities that are present in the ontology database, the derived relations are relations between the relevant entities that are derived from other published/unpublished documents, and the suggested relations are relations between the relevant entities that are suggested based on other published/unpublished documents using a machine learning algorithm;

access information about entities and semantic inter-relationships related to existing research work in the technical field from publicly accessible knowledge;

compare the entities and the semantic inter-relationships related to the current research work in the unpublished document with the entities and the semantic interrelationships related to existing research work in the technical field to determine a novelty of the unpublished document with respect to the publicly accessible knowledge, wherein the comparison of semantic inter-relationships comprises comparing each of the established relations, derived relations, and suggested relations related to the current research work with each of the each of the established relations, derived relations, and suggested relations related to existing research work in the technical field; and determine an assessment value of the unpublished document, based on the determined novelty of the unpublished document with respect to the publicly accessible knowledge, utilizing an expectation maximization algorithm, wherein the expectation maximization algorithm is an iterative algorithm generating more reliable results as a number of iterations increases.

2. The system of claim 1, wherein the technical field is pharmaceutical drug discovery, and wherein the relevant entities comprise data entries pertaining to one or more of drugs, pathways, proteins and targets.

3. The system of claim 2, wherein the semantic inter-relationships comprise established relations, derived relations and suggested relations between the one or more of drugs, pathways, proteins and targets.

4. The system of claim 1, wherein the processor of the server arrangement is configured to execute machine readable instructions that cause the server arrangement to:

obtain, from the client device or from at least one database server, information indicative of valuations of other documents related to previous research work of at least one of one or more contributors of the document;

process information indicative of the valuations of other documents to determine a contributor score associated with the at least one of one or more contributors of the unpublished document; and determine the assessment value of the unpublished document, based on the determined contributor score associated with the at least one of one or more contributors of the unpublished document.

5. The system of claim 1, wherein the processor of the server arrangement is configured to execute machine readable instructions that cause the server arrangement to:

obtain, from the client device or at least one database server, information indicative of reputation of at least one of one or more contributors of the unpublished document in the technical field;

process information indicative of reputation to determine a reputation score for the at least one of one or more contributors of the unpublished document; and determine the assessment value of the unpublished document, based on the determined reputation score for the at least one of one or more contributors of the unpublished document.

6. The system of claim 1, wherein the processor of the server arrangement is configured to execute machine readable instructions that cause the server arrangement to:

identify trending keywords related to research work in the technical field;

analyse the unpublished document to calculate count of presence of the identified trending keywords and terms similar to the identified trending keywords in the unpublished document;

process the calculated count of presence of the identified trending keywords and terms similar to the identified trending keywords in the unpublished document to determine a trend score associated with the unpublished document, and determine the assessment value of the unpublished document, based on the determined trend score associated with the unpublished document.

7. The system of claim 1, wherein the processor of the server arrangement is configured to execute machine readable instructions that cause the server arrangement to:

analyse the unpublished document to determine information pertaining to statistical significance of the experimental data in the unpublished document;

process the determined information pertaining to statistical significance of the experimental data to determine a significance factor associated with the unpublished document, and determine the assessment value of the unpublished document, based on the significance factor associated with the unpublished document.

8. The system of claim 1, wherein the processor of the server arrangement is configured to execute machine readable instructions that cause the server arrangement to:

analyse the unpublished document to determine information pertaining to completion of the experimental data in the unpublished document;

process the determined information pertaining to completion of the experimental data to determine a completion factor associated with the unpublished document; and determine the assessment value of the unpublished document, based on the completion factor associated with the unpublished document.

9. The system of claim 1, wherein the processor of the server arrangement is configured to execute machine readable instructions that cause the server arrangement to:

analyse the unpublished document to extract information pertaining to sample size taken into consideration for generating the experimental data in the unpublished document;

process the extracted information pertaining to the sample size to determine a confidence factor associated with the unpublished document, and determine the assessment value of the unpublished document, based on the confidence factor associated with the unpublished document.

10. The system of claim 1, wherein the processor of the server arrangement is configured to execute machine readable instructions that cause the server arrangement to:
- obtain, from the client device, information pertaining to cost incurred in the current research work;
- process the obtained information pertaining to the cost to determine a cost factor associated with the unpublished document; and
- determine the assessment value of the unpublished document, based on the cost factor associated with the unpublished document.

11. The system of claim 1, wherein the processor of the server arrangement is configured to execute machine readable instructions that cause the server arrangement to:
- determine a count of number of past purchases of the unpublished document;
- process the count of number of past purchases to determine an interest factor associated with the unpublished document; and
- determine the assessment value of the unpublished document, based on the interest factor associated with the unpublished document.

12. The system of claim 1, wherein the processor of the server arrangement is configured to execute machine readable instructions that cause the server arrangement to:
- obtain, from a plurality of database servers, a plurality of documents pertaining to the technical field of the current research work;
- process the plurality of documents to identify the entities and the semantic inter-relationships related to the technical field; and
- store the information indicative of the entities and the semantic interrelationships related to the technical field.

13. The system of claim 12, wherein the processor of the server arrangement is configured to execute machine readable instructions that cause the server arrangement to assign weights to the semantic inter-relationships related to the technical field, based on at least one of: types of causal relationships represented by the semantic inter-relationships between the entities, the number of documents in which the semantic inter-relationships occurred, ranks of digital libraries where the documents were published.

14. The system of claim 13, wherein the processor of the server arrangement is configured to execute machine readable instructions that cause the server arrangement to further assign weights to the semantic inter-relationships related to the current research work based on the weights of the semantic inter-relationships related to the technical field.

15. The system of claim 1, wherein the processor of the server arrangement is configured to execute machine readable instructions that cause the server arrangement to determine the assessment value of the unpublished document in a cryptocurrency for enabling transactions of the unpublished document using a blockchain.

16. A method for valuation of an unpublished document providing experimental data related to current research work in a technical field, comprising:
- obtaining, from a client device, information pertaining to the unpublished document by executing a trusted software application that, when executed at the client device, allows a user to select the unpublished document and processes the selected unpublished document to extract the information pertaining to the unpublished document, and mapping, ontologically, the information pertaining to the unpublished document to identify relevant entities and semantic inter-relationships between identified entities for the current research work in the unpublished document, wherein the information pertaining to the unpublished document comprises at least one of: an abstract of the unpublished document, a conclusion of the unpublished document, a brief note provided as an input by the user, and any set of information indicative of the entities and the semantic interrelationships between the entities as mentioned in the unpublished document, wherein the semantic inter-relationships comprise: established relations, derived relations, and suggested relations between the relevant entities, and wherein the established relations are relations between the relevant entities that are present in the ontology database, the derived relations are relations between the relevant entities that are derived from other published/unpublished documents, and the suggested relations are relations between the relevant entities that are suggested based on other published/unpublished documents using a machine learning algorithm;
- accessing information about entities and semantic inter-relationships related to existing research work in the technical field from publicly accessible knowledge;
- comparing the entities and the semantic inter-relationships related to the current research work in the unpublished document with the entities and the semantic interrelationships related to existing research work in the technical field to determine a novelty of the unpublished document with respect to the publicly accessible knowledge, wherein the comparison of semantic inter-relationships comprises comparing each of the established relations, derived relations, and suggested relations related to the current research work with each of the each of the established relations, derived relations, and suggested relations related to existing research work in the technical field; and
- determining an assessment value of the unpublished document based on the determined novelty of the unpublished document with respect to the publicly accessible knowledge, utilizing an expectation maximization algorithm, wherein the expectation maximization algorithm is an iterative algorithm generating more reliable results as a number of iterations increases.

17. The method of claim 16 further comprising:
- obtaining a plurality of documents pertaining to the technical field of the current research work;
- processing the plurality of documents to identify the entities and the semantic inter-relationships related to the technical field; and
- storing the information indicative of the entities and the semantic interrelationships related to the technical field.

18. The method of claim 17 further comprising assigning weights to the semantic inter-relationships related to the technical field, based on at least one of: types of causal relationships represented by the semantic inter-relationships between the entities, the number of documents in which the semantic inter-relationships occurred, ranks of digital libraries where the documents were published.

19. The method of claim 18 further comprising assigning weights to the semantic inter-relationships related to the current research work based on the weights of the semantic inter-relationships related to the technical field.

20. A computer program product for assessing valuation of an unpublished document, wherein the unpublished document is related to current research work of in a technical field, the computer program product comprising a non-transitory machine-readable data storage medium having stored thereon program instructions that, when accessed by a processing device, cause the processing device to:

obtain, from a client device, information pertaining to the unpublished document by executing a trusted software application that, when executed at the client device, allows a user to select the unpublished document and processes the selected unpublished document to extract the information pertaining to the unpublished document, and ontologically map the information pertaining to the unpublished document to identify relevant entities and semantic inter-relationships between identified entities for the current research work in the unpublished document, wherein the information pertaining to the unpublished document comprises at least one of: an abstract of the unpublished document, a conclusion of the unpublished document, a brief note provided as an input by the user, and any set of information indicative of the entities and the semantic interrelationships between the entities as mentioned in the unpublished document, and wherein the semantic interrelationships comprise: established relations, derived relations, suggested relations between the relevant entities, and wherein the established relations are relations between the relevant entities that are present in the ontology database, the derived relations are relations between the relevant entities that are derived from other published/unpublished documents, and the suggested relations are relations between the relevant entities that are suggested based on other published/unpublished documents using a machine learning algorithm;

access information about entities and semantic inter-relationships related to existing research work in the technical field from publicly accessible knowledge;

compare the entities and the semantic inter-relationships related to the current research work in the unpublished document with the entities and the semantic inter relationships related to existing research work in the technical field to determine a novelty of the unpublished document with respect to the publicly accessible knowledge, wherein the comparison of semantic inter-relationships comprises comparing each of the established relations, derived relations, and suggested relations related to the current research work with each of the each of the established relations, derived relations, and suggested relations related to existing research work in the technical field; and determine an assessment value of the unpublished document based on the determined novelty of the unpublished document with respect to the publicly accessible knowledge, utilizing an expectation maximization algorithm, wherein the expectation maximization algorithm is an iterative algorithm generating more reliable results as a number of iterations increases.

* * * * *